(12) United States Patent
Yuan et al.

(10) Patent No.: US 11,026,431 B2
(45) Date of Patent: Jun. 8, 2021

(54) STUFFING AND MOLDING MECHANISM OF DOUGH FOOD PRODUCT PROCESSING MACHINE

(71) Applicant: ANKO FOOD MACHINE CO., LTD., New Taipei (TW)

(72) Inventors: Chien Yuan, New Taipei (TW); You-Chen Tsai, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 26 days.

(21) Appl. No.: 16/421,484

(22) Filed: May 24, 2019

(65) Prior Publication Data

US 2020/0367510 A1    Nov. 26, 2020

(51) Int. Cl.
*A21C 9/06* (2006.01)
*A21C 11/10* (2006.01)

(52) U.S. Cl.
CPC .............. *A21C 9/063* (2013.01); *A21C 11/10* (2013.01)

(58) Field of Classification Search
CPC . A21C 9/061; A21C 9/063; A21C 9/066–068; A21C 11/103; A21C 11/22; A21C 9/06
See application file for complete search history.

(56) References Cited

U.S. PATENT DOCUMENTS

2017/0127687 A1* 5/2017 O .......................... A21C 11/22
2019/0350210 A1* 11/2019 Guareschi .............. A21C 9/066

* cited by examiner

*Primary Examiner* — Marc C Howell
*Assistant Examiner* — John J DeRusso
(74) *Attorney, Agent, or Firm* — Leong C. Lei

(57) ABSTRACT

A stuffing and molding mechanism of a dough food product processing machine includes a stationary structure inside which first and second mold rollers are arranged. At least one demolding rotary disc includes a disc body formed with a shaft hole by which a retention key is provided. The demolding rotary disc is fit to an end of a molding cutter of one of the mold rollers by means of the shaft hole for synchronous rotation therewith. At least one demolding pawl is raised from one side of the disc body that is adjacent to the molding cutter. A tubular dough skin filled with stuffing is supplied between the two molding cutters to be pressed and cut and then sealed to form a dumpling. Demolding of the dumpling is achieved by having the demolding pawl that is provided on the demolding rotary disc contact and push one side of the dumpling.

10 Claims, 15 Drawing Sheets

STUFFING AND MOLDING MECHANISM OF DOUGH FOOD PRODUCT PROCESSING MACHINE

TECHNICAL FIELD OF THE INVENTION

The present invention relates generally to a stuffing and molding mechanism of a dough food product processing machine, and more particularly to a stuffing and molding mechanism of a dough food product processing machine that includes a fast demolding design specifically applicable to a stuffing and molding mechanism that is provided with molding holes in a couple and allowing fast demolding of fully-stuffed dumpling to alleviate drawbacks of the prior art that allows molding with only one-part molds.

DESCRIPTION OF THE PRIOR ART

One of the most widely applications of a dough food product machine is a stuffed dough food product, such as a dumpling machine and machines for processing other stuffed dough food products. Such machines generally have a structural configuration that, as shown in FIG. 9, comprises a machine body 90, in which a power unit is arranged. A control unit 92 controls a stuffing feeding unit 91 to feed, in a direction from a top side toward a bottom side, a stuffing material 911 for conveying horizontally (rightward as shown in the drawing) to a dough feeding unit 93, where the stuffing material 911 that has been well blended is filled into an interior of a dough skin formed by molding a dough block 931, followed by cutting and sealing with a shaping unit 94 to form a dough food product that is filled with stuffing, such as a dumpling. This invention is provided to overcome or alleviate a bottleneck occurring in the shaping unit 94.

As shown in FIG. 10, a prior art shaping or molding mechanism 94 generally comprises a powder spraying device 941 arranged at a top side of a machine body and a mold roller 942 and a rolling wheel 944 at a lower side, wherein the mold roller 942 has a roller surface that is formed with multiple sets of molding cutters 943 (that are also mold cavities that form stuffed dough food products). Thus, a tubular dough skin that is filled in the interior thereof with a stuffing material, when conveyed to a location between the mold roller 942 and the rolling wheel 944, is subjected to pressing and cutting by and between the molding cutter 943 and the rolling wheel 944 to form a dumpling 95 that is attached to the rolling wheel 944. A doctor blade 945 is arranged, in an inclined manner, adjacent to the rolling wheel 944 in the rotating direction thereof to help detach the dumpling 95 from the surface of the rolling wheel 944 to subsequently slide to a belt conveyor assembly 946 to be conveyed for subsequent collection and packaging.

As shown in FIGS. 10 and 11, the prior art uses a mold roller 942 and a rolling wheel 944 to press and cut for forming a dumpling 95. The dumpling 95 so made has one side that is a stuffing filled curved surface 951, which is the side that is rolled and pressed by the mold roller 942, and an opposite side that is a flat and generally planar surface 952, which is the side that is in contact with and attached to the rolling wheel 944. The dumpling 95 so made does not show an appealing outside configuration. Also, the thickness T2 of the dough skin at the stuffing filled curved surface 951 of the dumpling 95 is relatively thin, while the thickness T1 of the flat surface 952 is relatively thick. This makes the mouth feeling of the dumpling 95 poor. This is the reason that a machine-made stuffed dough food product often taste worse than a hand-made one.

If the prior art is changed to use a mold roller 942 of each of the opposite sides of pressing and cutting, then a dumpling 95 cannot be smoothly demolded and removed therefrom and would be brought back into the next shaping or molding section. This leads to interruption of production. This is a bottleneck in the prior art.

SUMMARY OF THE INVENTION

The primary objective of the present invention is to overcome the deficiency of a prior art stuffing and molding mechanism of a dough food product processing machine, where one mold roller must be used in combination with a rolling wheel so as to cause a bottleneck of making dumplings of poor quality. This invention provides a structural arrangement that comprises a first mold roller and a second mold roller that are arranged opposite to each other inside a stationary structure; and at least one demolding rotary disc comprising a disc body formed with a shaft hole in a central portion thereof, a retention key being provided at a location of the shaft hole, the demolding rotary disc being fit, through the shaft hole, to an end of a molding cutter of one of the mold rollers for synchronous rotation therewith, the disc body having a side adjacent to the molding cutter and provided with at least one demolding protrusion raised therefrom. As such, in a dumpling making machine, a tubular dough skin that is filled with a stuffing material may be fed to a location between the two molding cutters to be pressed and cut, and sealed and closed, to form a dumpling, followed by demolding by having one side of the dumpling contacted and pushed by the demolding protrusion provided on the demolding rotary disc, thereby achieving efficient production of dumplings that have homogeneous thicknesses on two opposite sides and provide a good taste.

Another objective of the present invention is to increase the throughput of the above-discussed dumpling by providing a structural arrangement including two demolding rotary discs that are respectively arranged at two sides of the molding cutters of the mold rollers so that the shaping molds may simultaneously provide mold cavities on two opposite sides to increase the number of the mold cavities provided.

Another objective of the present invention is to provide diversification of the outside configuration of the dumplings so made by providing a structural arrangement that includes more than one demolding protrusion provided on the demolding rotary disc and the number of the protrusions is selected to correspond to the number of mold cavities provided on the molding cutter such as in a regular design, each mold cavity is provided with at least one demolding protrusion corresponding thereto.

A further objective of the present invention is to make the manufacturing of the demolding protrusion that is provided on the demolding rotary disc easy by having the demolding protrusion and the disc body integrally formed together as a unitary structure. However, for easy disassembling and replacement of a damaged demolding protrusion, the demolding protrusion can be manufactured separately, as an alternative, and mounted to a disc body by one of welding, a spring button, screwing, bonding, riveting, and fitting. Both solutions are applicable in this invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
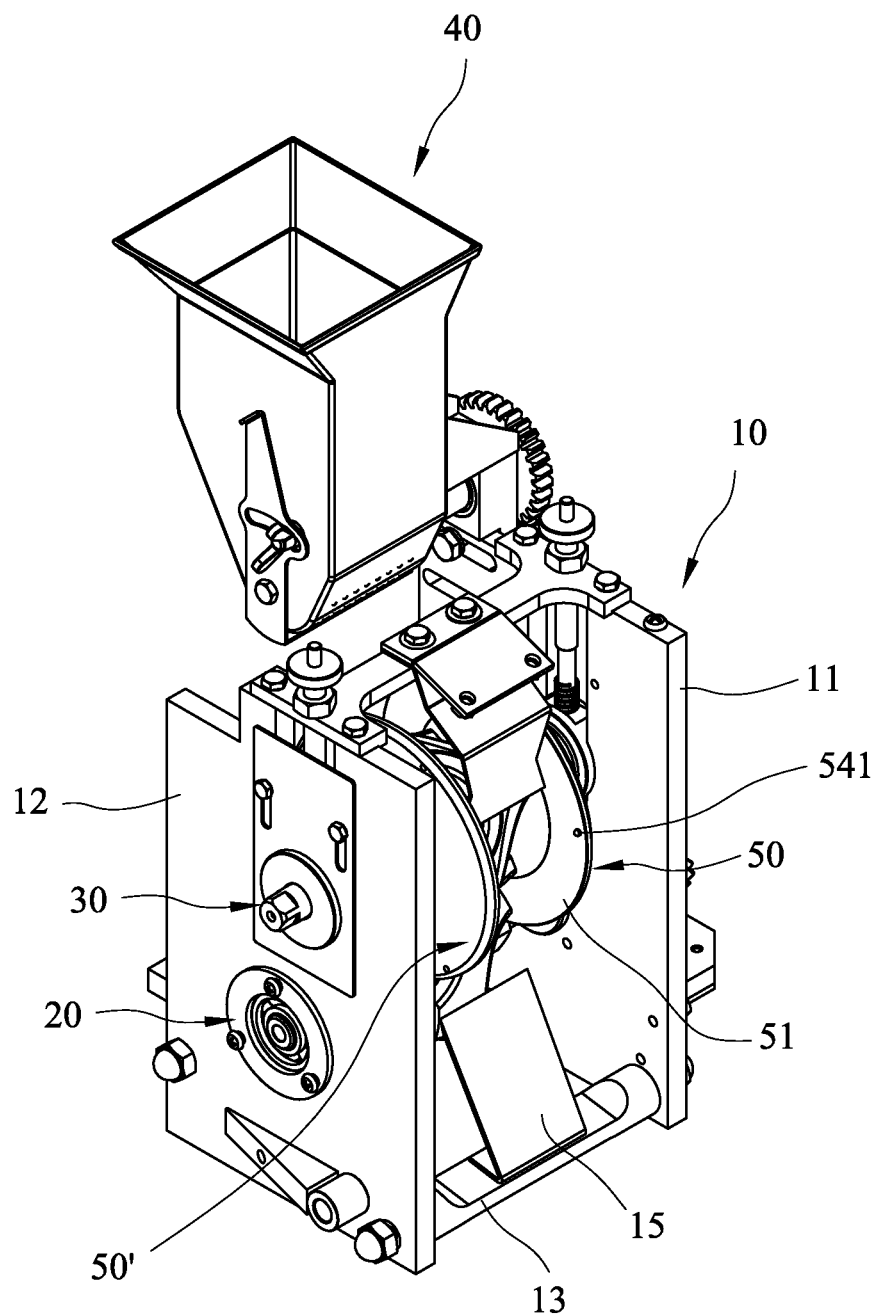
FIG. 1 is a perspective view of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1, 2, 3, and 4, the present invention at least comprises the following components/parts:

A stationary structure 10 comprises two side boards 11, 12 that are arranged opposite to each other and are connected to each other by a plurality of support brace assemblies 13, 14. The two side boards 11, 12 are respectively formed with two shaft holes 111, 121 that correspond to each other and two elongate shaft holes 112, 122 that correspond to each other. One of the support brace assemblies, such as the support brace assembly 13, which is arranged at a discharge end is provided with a lower doctor blade 15.

A first mold roller 20 comprises a transmission shaft 21 that penetrates through a molding cutter 23. An end of the transmission shaft 21 is provided with a toothed wheel assembly 22. The first mold roller 20 is arranged to have the transmission shaft 21 extending through and received in the shaft holes 111, 121 of the two side boards 11, 12 so as to support the molding cutter 23 between the two side boards 11, 12.

A second mold roller 30 comprises a transmission shaft 31 that penetrates through a molding cutter 33. An end of the transmission shaft 31 is provided with a toothed wheel assembly 32. The second mold roller 30 is arranged to have the transmission shaft 31 extending through and received in the elongate shaft holes 112, 122 of the two side boards 11, 12 so as to support the molding cutter 33 between the two side boards 11, 12, The first mold roller 20 and the second mold roller 30 are arranged such that the molding cutters 23, 33 thereof are in mating engagement with each other and the toothed wheel assemblies 22, 32 are coupled to a power mechanism to be rotatable synchronously. The first mold roller 20 and the second mold roller 30 are arranged to engage with each other in a vertical direction as being set at upper and lower sides respectively.

Figure 2:
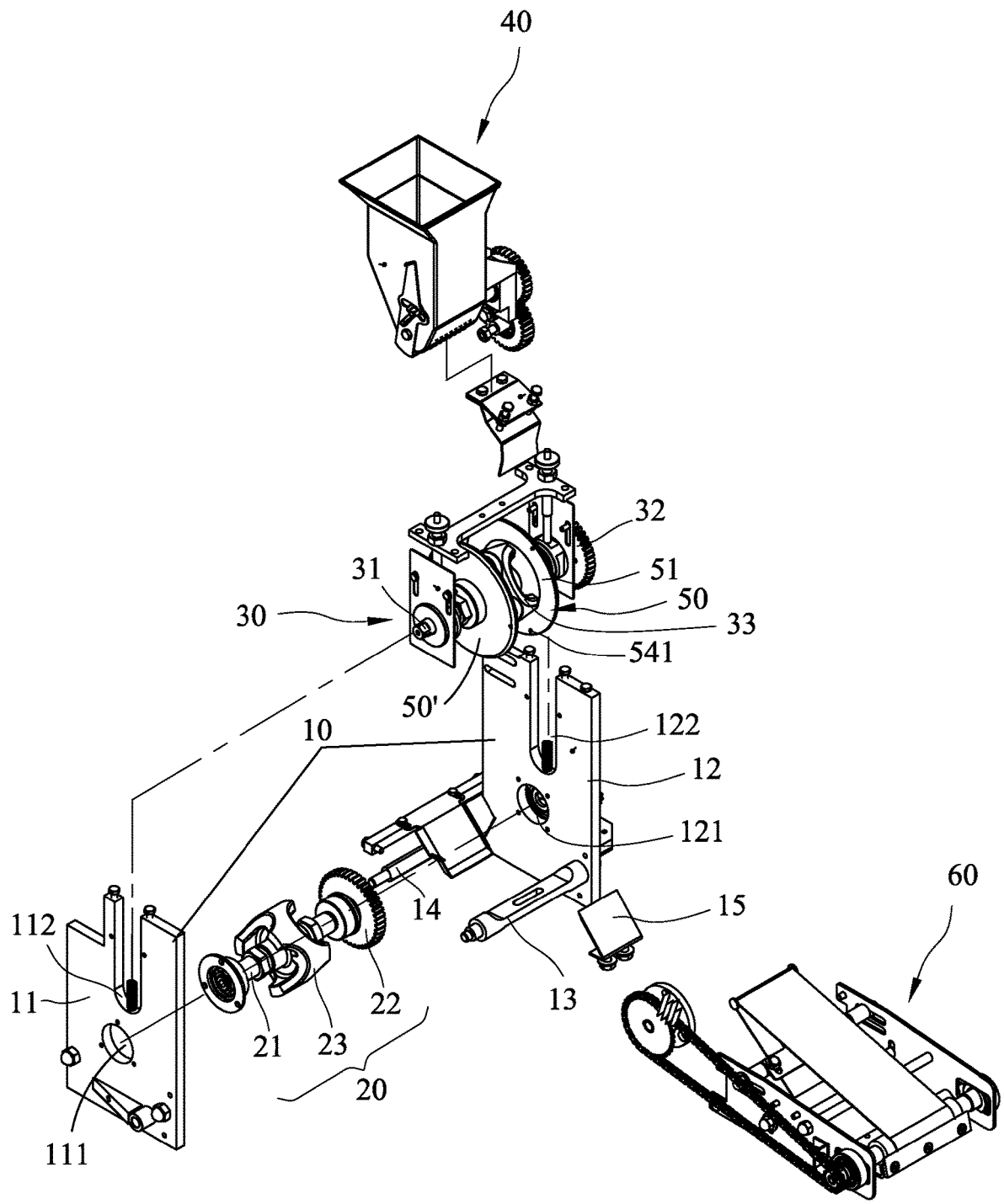
FIG. 2 is an exploded view of the present invention.
Figure 5:
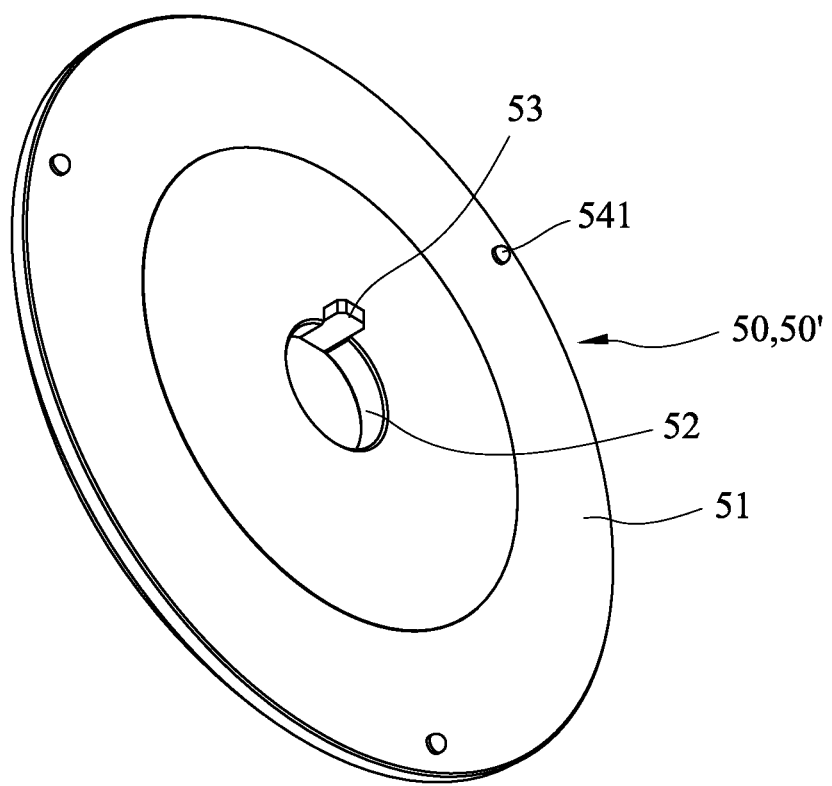
FIG. 5 is a schematic view showing a demolding system of use of the present invention.

As shown in FIGS. 1, 2, and 5, a group of two demolding rotary discs 50, 50' is provided, each comprising a disc body 51, which is formed with a shaft hole 52 in a center. The shaft hole 52 is provided with a retention key 53. The demolding rotary discs 50 are fit to two ends of the molding cutter 33 of the first mold roller 30 by means of the shaft holes 52 for synchronous rotation. The disc body 51 is provided, on a side thereof adjacent to the molding cutter 33, with a number of projecting demolding protrusions 541. The number of the demolding protrusions 541 is selected to correspond to a number of one-side mold cavities of the molding cutter 33. Three sets are used as an example for illustration in this invention, but this invention is not limited to such a number.

In an embodiment, the retention key 53 is keyed joint (as shown in FIG. 5) at a circumferential edge of the shaft hole 52 to have the demolding rotary discs 50, 50' to rotate in unison with the molding cutter 33, and alternatively, any one of the measures of welding, screwing, bonding, riveting, fitting, spring button, or pining can be used.

As shown in FIGS. 1, 2, 4, and 6A, The present invention may include additional accessary parts. For example, a powder spraying device 40 is mounted above the first mold roller 20 to timely spray dry powder (such as flour) to allow for easy molding of a dough food product; a belt conveyor assembly 60 collects and conveys a stuffed dough food product (such as a dumpling) manufactured with this invention to a subsequent processing station. The powder spraying device 40 and the belt conveyor assembly 60 can be formed with any known mechanisms that are additionally provided for include additional functions, but are not considered novel features of the present invention.

Figure 6A:
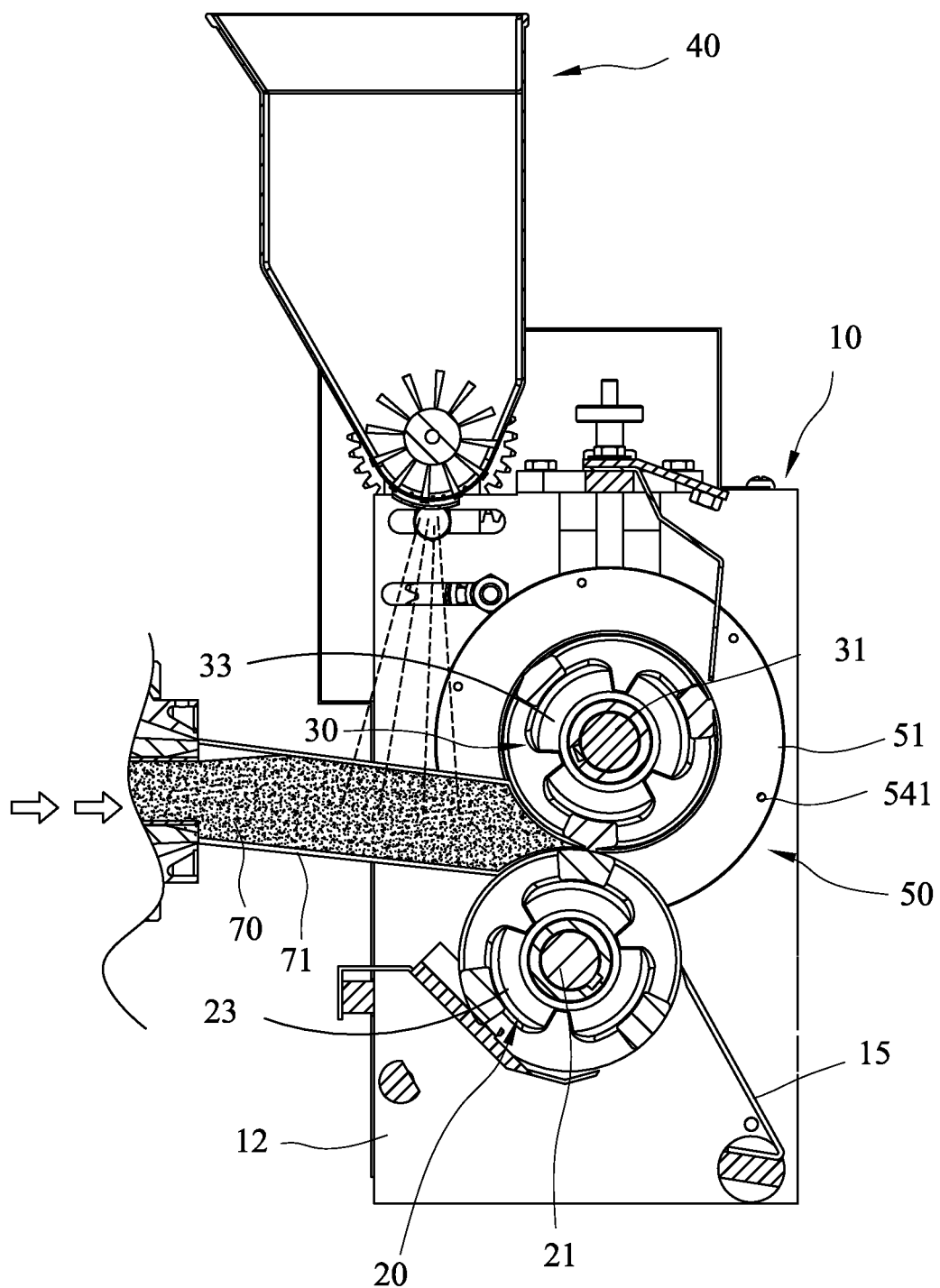
FIG. 6A is a first one of successive views illustrating an operation of the present invention.
Figure 6B:
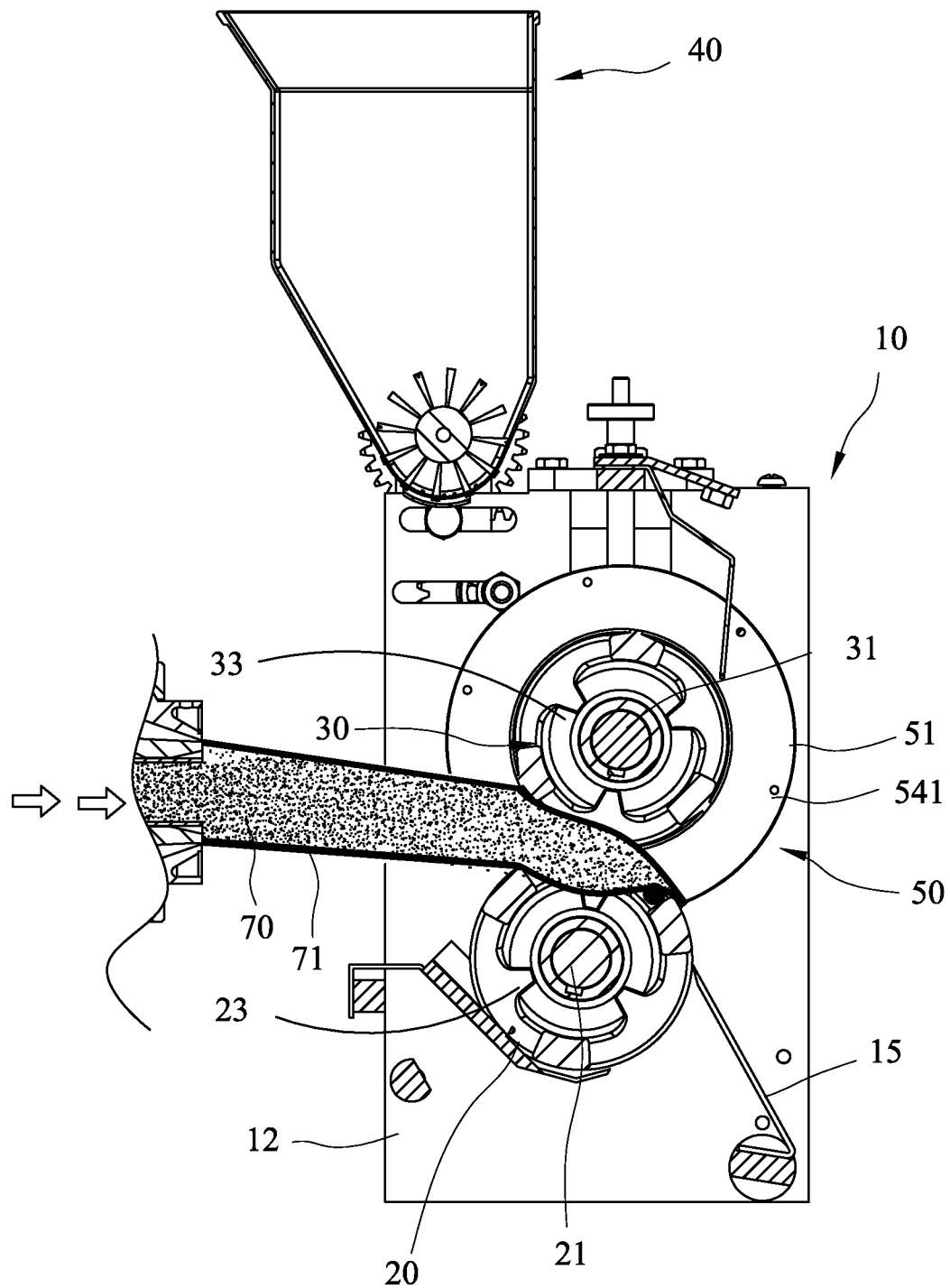
FIG. 6B is a second one of the successive views illustrating the operation of the present invention.
Figure 6C:
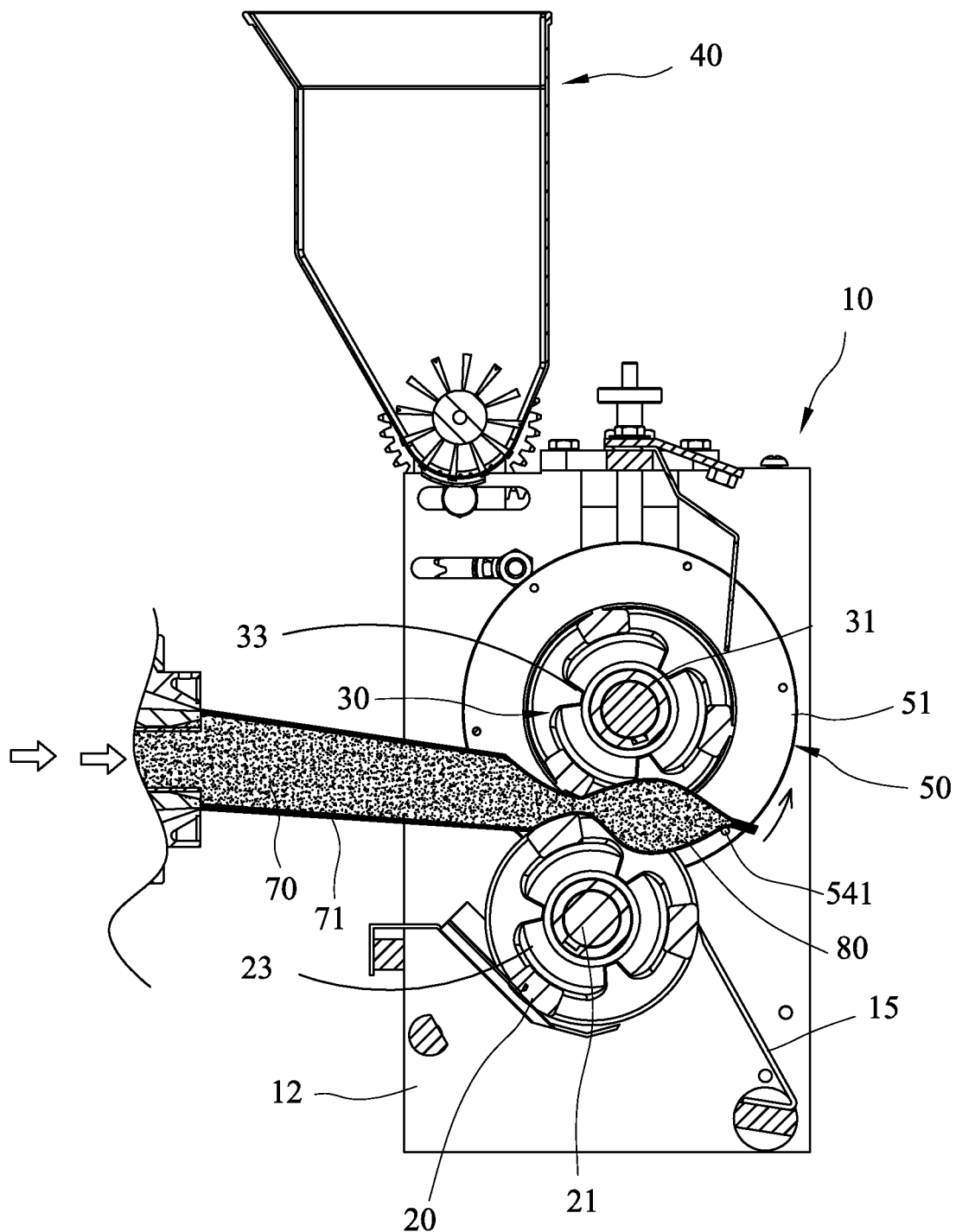
FIG. 6C is a third one of the successive views illustrating the operation of the present invention.
Figure 7A:
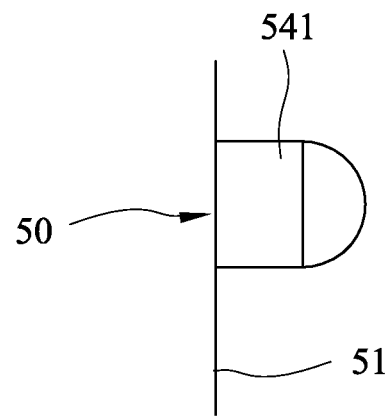
FIG. 7A is a first schematic view illustrating a demolding protrusion of the demolding system of the present invention.
Figure 7B:
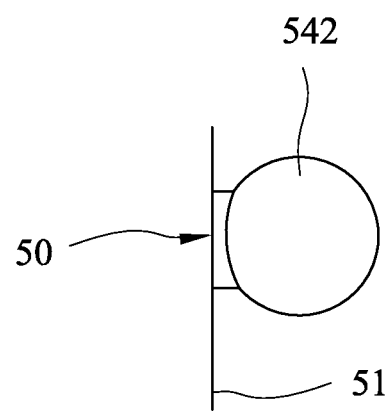
FIG. 7B is a second schematic view illustrating a demolding protrusion of the demolding system of the present invention.
Figure 7C:
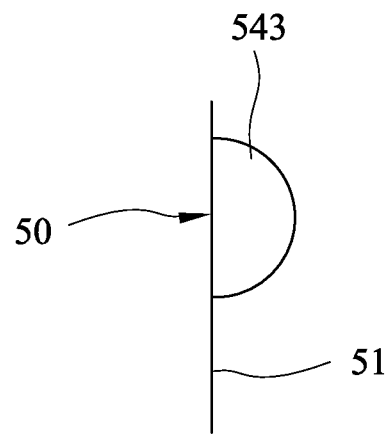
FIG. 7C is a third schematic view illustrating a demolding protrusion of the demolding system of the present invention.
Figure 7D:
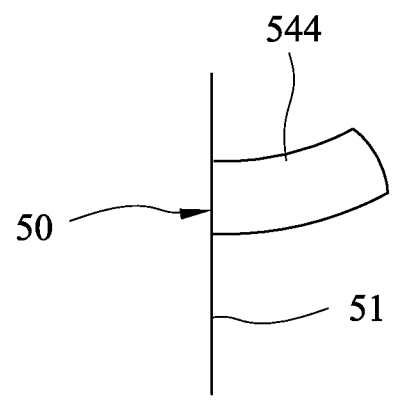
FIG. 7D is a fourth schematic view illustrating a demolding protrusion of the demolding system of the present invention.
Figure 7E:
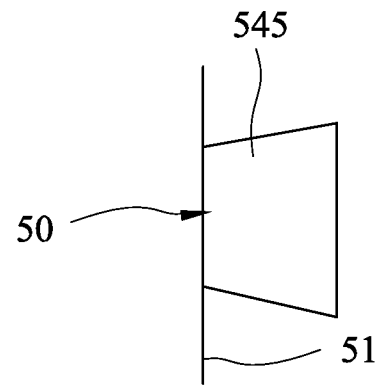
FIG. 7E is a fifth schematic view illustrating a demolding protrusion of the demolding system of the present invention.
Figure 7F:
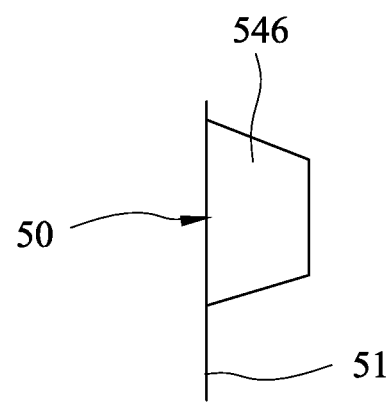
FIG. 7F is a sixth schematic view illustrating a demolding protrusion of the demolding system of the present invention.
Figure 7G:
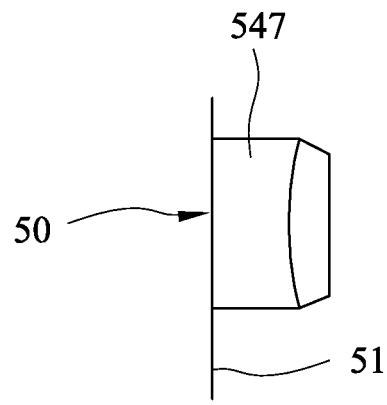
FIG. 7G is a seventh schematic view illustrating a demolding protrusion of the demolding system of the present invention.
Figure 8:
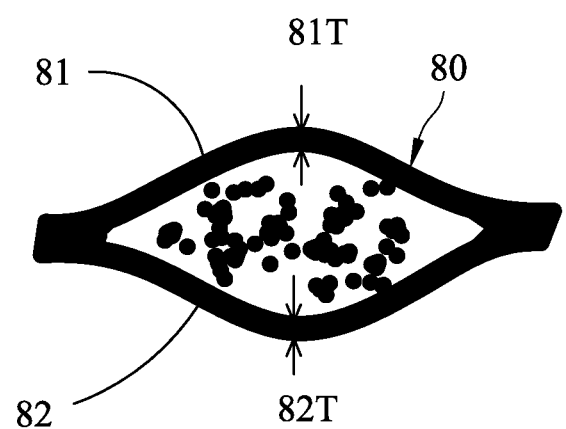
FIG. 8 is a schematic view illustrating a dumpling made with the stuffing and molding mechanism of the present invention.
Figure 9:
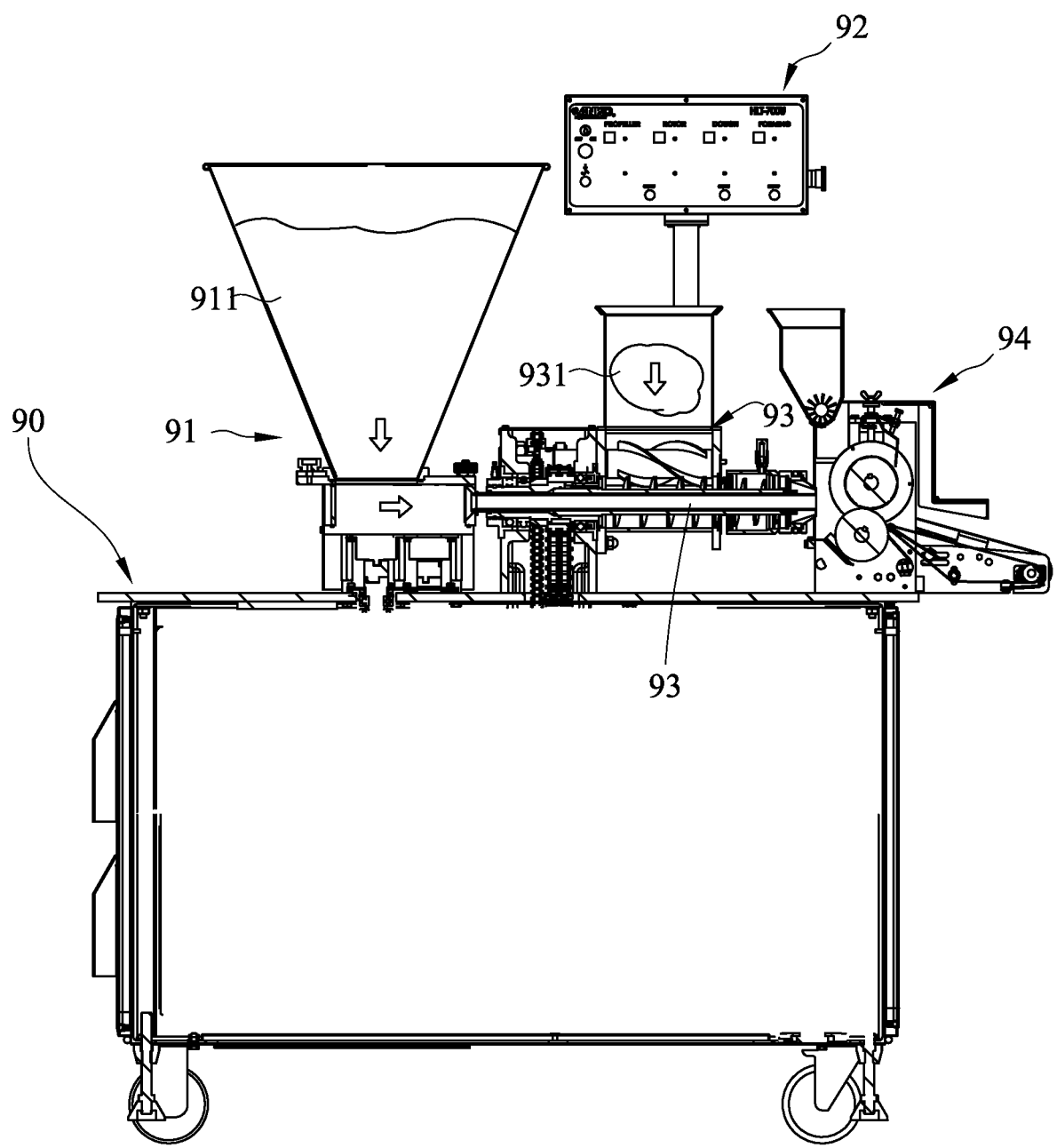
FIG. 9 is a schematic view illustrating a position of the stuffing and molding mechanism used in a dough food product stuffing machine.
Figure 10:
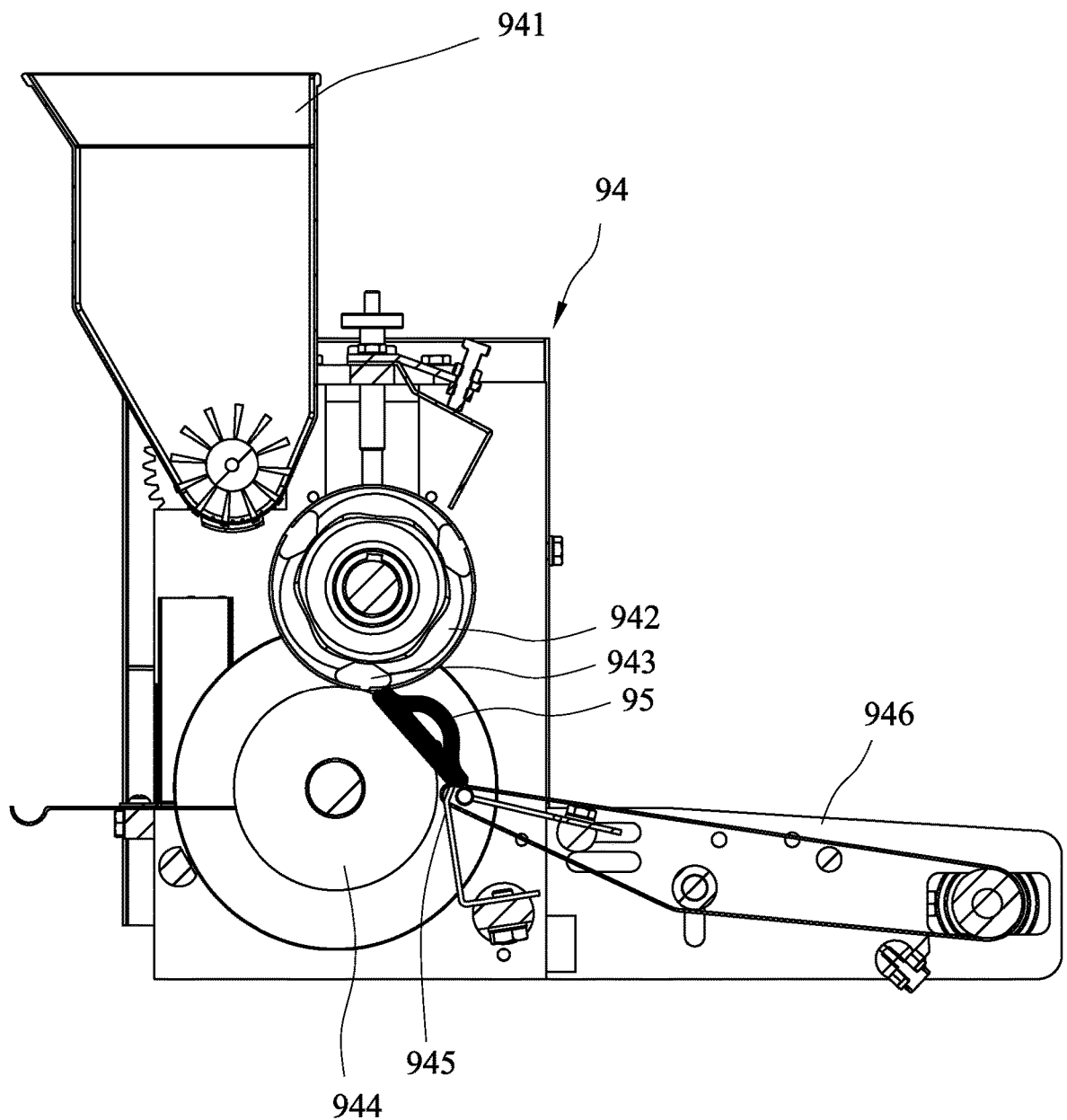
FIG. 10 is a cross-sectional view of a prior art stuffing and molding mechanism.
Figure 11:
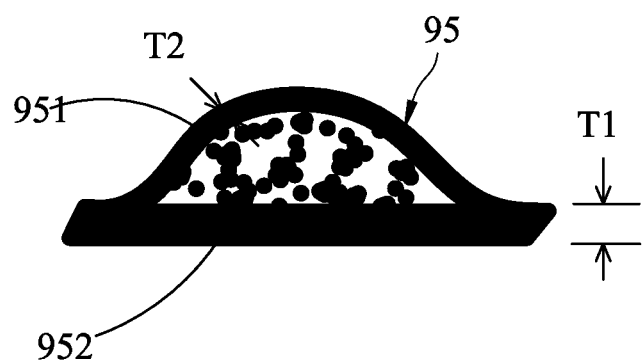
FIG. 11 is a schematic view illustrating a dumpling made with the prior art stuffing and molding mechanism.

The present invention is applicable to a dumpling machine. As shown in FIG. 9, when a stuffing feeding unit 91 feeds, in a direction from a top side to a bottom side, a stuffing material 911 for conveying horizontally (rightward as shown in the drawing) to a dough feeding unit 93, where the stuffing material 911 that has been well blended is filled into an interior of a dough skin formed by pressing a dough block 931, as shown in FIG. 6A, in order to form a tubular dough skin 71 that contains therein a stuffing material 70 to subsequently enter between the two molding cutters 23, 33 of this invention, as shown in FIGS. 6B and 6C, to have the tubular dough skin 71 that contains the stuffing material 70 therein pressed and cut and sealed to form a dumpling 80. Since this invention includes two molding cutters 23, 33 that are arranged opposite to each other, dumpling 80 so manufactured, as shown in FIG. 8, is a rounded and fully-filled dumpling 80 that has two curved side surfaces 81, 82. As shown in FIGS. 6B and 6C, when the dumpling 80 is molded and shaped, the demolding protrusion 541 of the demolding rotary disc 50 contacts and pull out a side of dumpling 80 to realize easy demolding and conveyed away by the belt conveyor assembly 60.

As shown in FIG. 5, the demolding protrusions 541 of the demolding rotary disc 50 may be of various modified structures in order to suit the needs of different outside configurations of various dumpling products. FIGS. 7A, 7B, 7C, 7D, 7E, 7F, and 7G illustrate demolding protrusions 541, 542, 543, 544, 545, 546, 547 of different configurations, which are respectively a peg with a dome-shaped top, an elevated sphere, a raised hemisphere, a curved peg, and raised wedges, and any configuration that is arranged, as a raised part, to contact and pull out a side of a dumping 80 during molding and shaping could provide the desired purpose of this invention. Further, the demolding protrusions 542, 543, 544, 545, 546, 547, 541 are integrally formed with the disc body 51 as a unitary structure, but can manufactured separately to be then fixed to the disc body 51 by means of one of the measures of spring button, screwing, bonding, riveting, fitting, and welding.

As shown in FIG. 2, the present invention provides a structural arrangement that breaks through the predicament of the prior art that it is impossible to use two mold cutters 23, 33 because of constraints of demolding. Thus, the dumpling 80 made with the structural arrangement of the present invention is subjected to pressing and cutting by mold holes so as to show two curved side surfaces 81, 82, and upper-side and lower-side dough skins show uniform thicknesses 81T, 82T. Thus, the dumpling 80 made with the present invention is fully filled with stuffing and looks crammed and round, providing better mouth feeling and being close to that made with hands, so as to improve the quality of dough food products.

Figure 3:
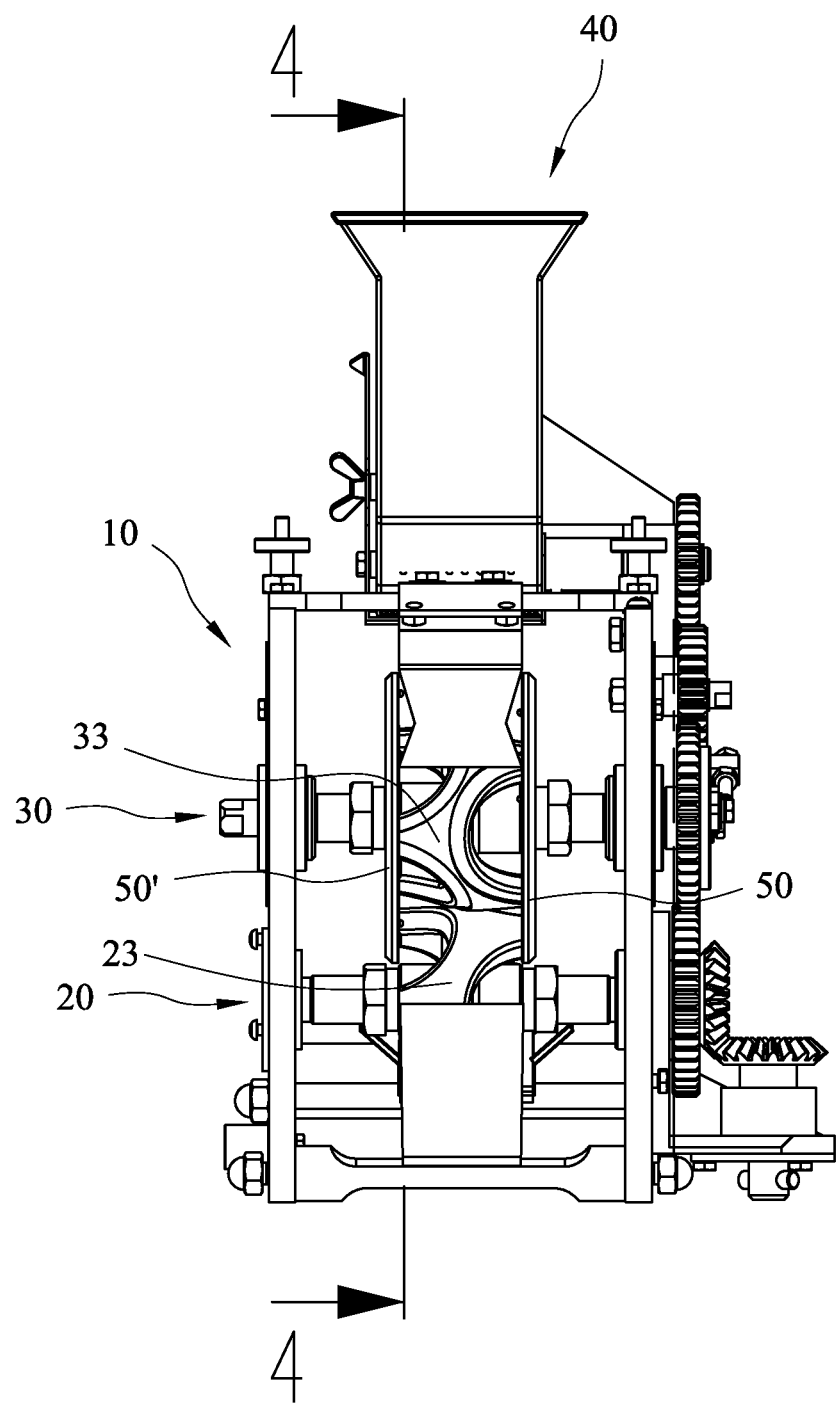
FIG. 3 is a front view of the present invention.
Figure 4:
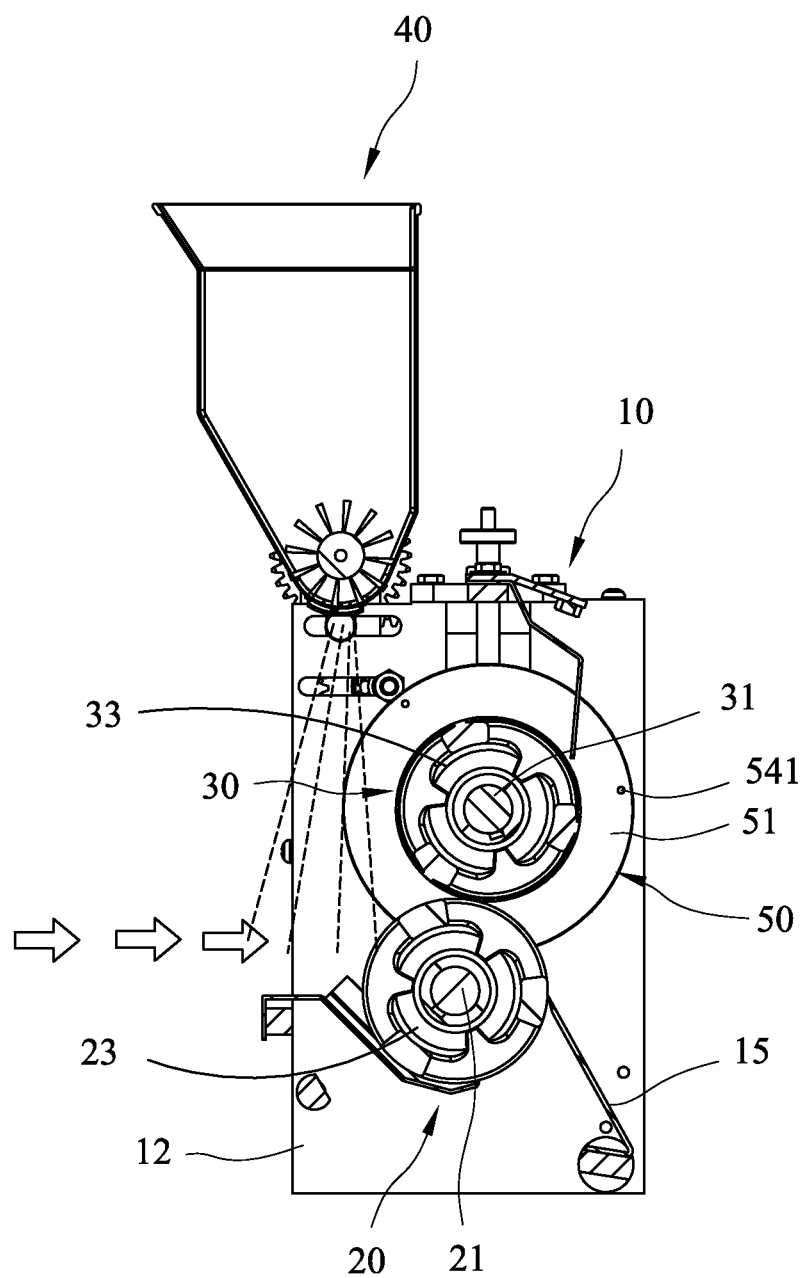
FIG. 4 is a cross-sectional view of FIG. 3.

As shown in FIGS. 6B and 6C, the present invention uses only the demolding rotary discs 50 to realize the purpose of quick demolding of the molded dumplings, therefore the cost could be reduced significantly. Also, the demolding rotary discs 50 may also function as blocking boards and as shown in FIG. 3, the two demolding rotary discs 50, 50' provide a surface area that sufficient to cover and shield a pressing and cutting site of the two molding cutters 23, 33 so as to block the dumplings from unexpectedly falling during molding thereof.

As shown in FIGS. 1 and 2, the present invention demonstrates an arrangement that involves a group of two demolding rotary discs 50, 50'. However, in actual uses, one single demolding rotary disc 50 is completely capable of achieving the desired design purposes; however, two may be used to provides two-side mold cavities of the molding cutter 33 to help increase throughput.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A stuffing and molding mechanism of a dough food product processing machine, at least comprising:
    a stationary structure, which comprises two side boards arranged opposite to each other, the two side boards being formed with two shaft holes and two elongate shaft holes opposite to each other;
    a first mold roller, which comprises a transmission shaft penetrating through a molding cutter, the transmission shaft having an end section to which a toothed wheel assembly is mounted, the first mold roller being arranged to have the transmission shaft extending through and supported on the shaft holes of the two side boards so as to support the molding cutter between the two side boards;
    a second mold roller, which comprises a transmission shaft penetrating through a molding cutter, the transmission shaft having an end section to which a toothed wheel assembly is mounted, the second mold roller being arranged to have the transmission shaft extending through and supported on the elongate shaft holes of the two side boards so as to support the molding cutter between the two side boards, wherein the first mold roller and the second mold roller are arranged such that the molding cutters are in mating engagement with each other and the toothed wheel assemblies are coupled to a power mechanism to be rotatable synchronously; and
    at least one demolding rotary disc, which comprises a disc body that is formed with a shaft hole in a central portion thereof so that the at least one demolding rotary disc is fit, through the shaft hole, to one end of the molding cutter of one of the mold rollers, the disc body having a side surface that is adjacent to the molding cutter and is formed with at least one demolding protrusion raised therefrom, wherein a tubular dough skin that is filled with a stuffing material, upon entry into a space between the two molding cutters, is subjected to pressing and cutting and sealing to form a dumpling, which is demolded by having a side of the dumpling contacted and pulled out by the at least one demolding protrusion that is provided on the at least one demolding rotary disc.

2. The stuffing and molding mechanism according to claim 1, wherein the at least one demolding protrusion of the disc body comprise a number of the demolding protrusions, the number being greater than one.

3. The stuffing and molding mechanism according to claim 1, wherein the first mold roller and the second mold roller are paired with each other in a vertical direction as being positioned at upper and lower sides respectively.

4. The stuffing and molding mechanism according to claim 1, wherein the at least one demolding rotary disc comprises two demolding rotary discs that are respectively fit to two ends of the molding cutter of the one of the mold rollers.

5. The stuffing and molding mechanism according to claim 1, wherein the at least one demolding rotary disc comprises a retention key that is mounted by one of a spring button, screwing, adhesive bonding, riveting, fitting, and welding or by means of a transmission including a key or a pin, to have the at least one demolding rotary disc and the molding cutter of the one of the mold rollers rotatable simultaneously.

6. The stuffing and molding mechanism according to claim 1, wherein the at least one demolding protrusion of the at least one demolding rotary disc has a configuration that is selected as one of a peg with a dome-shaped top, an elevated sphere, a raised hemisphere, a curved peg, and a raised wedge.

7. The stuffing and molding mechanism according to claim 1, wherein the at least one demolding rotary disc has a surface area that covers a pressing and cutting site of the two molding cutters.

8. The stuffing and molding mechanism according to claim 1, wherein the at least one demolding protrusion and the disc body are integrally formed together.

9. The stuffing and molding mechanism according to claim 1, wherein the first mold roller is provided, on a top side thereof, with a powder spraying device.

10. The stuffing and molding mechanism according to claim 1, wherein the stationary structure is provided with a lower doctor blade under the first mold roller and the second mold roller.

\* \* \* \* \*